United States Patent [19]
Mercier et al.

[11] Patent Number: 4,772,369
[45] Date of Patent: Sep. 20, 1988

[54] ELECTROMAGNETIC TREATMENT OF WATER

[76] Inventors: Dominique Mercier, 3, rue des Tilleuls, Fampoux 62112; Andre Lobry, 71 bis, Avenue Kennedy, Arras 62000, both of France

[21] Appl. No.: 862,498

[22] PCT Filed: Aug. 23, 1985

[86] PCT No.: PCT/FR85/00227
§ 371 Date: Apr. 23, 1986
§ 102(e) Date: Apr. 23, 1986

[87] PCT Pub. No.: WO86/01496
PCT Pub. Date: Mar. 13, 1986

[30] Foreign Application Priority Data
Aug. 24, 1984 [FR] France .................. 84 13233

[51] Int. Cl.$^4$ .......... C02F 1/46; C25B 15/00; C25D 13/02
[52] U.S. Cl. ................. 204/149; 204/231; 204/260; 204/284; 204/151; 204/DIG. 5; 204/301
[58] Field of Search ............ 204/149, 151, 231, 271, 204/272, 255, 269, 275, DIG. 5, 86-87, 301, 284

[56] References Cited

U.S. PATENT DOCUMENTS

| | | | |
|---|---|---|---|
| 1,831,075 | 11/1931 | Neeley | 204/276 |
| 3,562,137 | 2/1971 | Gehring | 204/301 X |
| 3,785,954 | 1/1974 | Herbert | 204/275 X |
| 3,923,629 | 12/1975 | Shaffer | 204/260 |
| 4,036,716 | 7/1977 | Hulthe | 204/231 X |
| 4,088,550 | 5/1978 | Malkin | 204/231 X |
| 4,121,991 | 10/1978 | Miller et al. | 204/260 |
| 4,169,035 | 9/1979 | Stummer et al. | 204/260 |
| 4,278,522 | 7/1981 | Jacob et al. | 204/231 X |
| 4,426,261 | 1/1984 | Fushihara | 204/260 X |

FOREIGN PATENT DOCUMENTS 0601579 5/1948 United Kingdom .

*Primary Examiner*—Donald R. Valentine
*Attorney, Agent, or Firm*—Sandler & Greenblum

[57] ABSTRACT

A process and an apparatus for treating water which comprises decomposing the minerals dissolved in the water into cations comprising ferromagnetic, paramagnetic and residual particles, and disaggregating the cations and anions by utilizing ferromagnetic particles as a temporary mobile anode facing a strong cathode and paramagnetic particles as a weak cathode. The disaggregated minerals form a dielectric layer on the strong cathode, which is extracted.

11 Claims, 3 Drawing Sheets

ELECTROMAGNETIC TREATMENT OF WATER

BACKGROUND OF THE INVENTION

The present invention utilizes the electromagnetic properties of electric currents for the conditioning and demineralization of water.

Apparatuses utilizing the passage of an electric current between two electrodes submerged in water can be grouped in three families:

1. Those which utilize electricity with a voltage which allows for complete electrolysis (9 volts and higher) and generally by cyclical discharge;
2. Those which utilize electricity with a voltage less than 3 volts which allow for only a partial electrolysis with formation of a polarization layer on the cathode, generally in continuous current; in these two families the anode absorbs the electrons transported by electrophoresis and the electrification by influence, which interferes with the effect sought;
3. The electrodialysis process which utilizes the migration of positive ions across a C type membrane and the migration of negative ions across a type A membrane under the influence of a continuous voltage between two electrodes. This process runs into substantial difficulties; the membranes allow ions to pass which they should stop, their electrical resistance and the polarization increase the consumption of energy, the deposits of salts, and the living organisms are disruptive.

SUMMARY OF THE INVENTION

The process and apparatus according to the invention are based upon the apparatus explained in the application filed in France under No. 84 13233 and compliments it in such a way as to obtain a more or less forced demineralization without utilization of C or A type membranes.

The invention differs from existing processes in that a difference of electrical potential of less than 3 volts established between an electro denominated "strong cathode" and an electrode denominated "weak cathode" fed by two simultaneous electrical currents, continuous or impulsive, in opposite directions and of different voltages. The choice of the voltages determines the difference of potential sought between the strong cathode and the weak cathode corresponding to a salt contained in the water, calcium carbonate for example.

The system is maintained at the selected voltage by a stabilizer. A current of electrons flows from the strong cathode to the weak cathode acting as an anode, limited by the opposition of the inverse voltage. This current engenders an electromagnetic field acting on the salts contained in the water which traverses the treatment chamber, otherwise denominated ionization and neutralization chamber. For a better understanding, we look to the case of the hydrogen carbonate or calcium $Ca(HCO_3)$ which is subjected to the action of the electromagnetic field and decomposes into calcium carbonate ($CaCO_3$), carbon dioxide ($CO_2$), hydrogen and hydroxyl OH. The potential of the forming $CaCO_3$ particles is less than that of the weak cathode and at greater rate than that of the strong cathode: the forming $CaCO_3$ particles are in the anode position vis-a-vis the electrodes of the apparatus. The $CaCO_3$ particles which are forming are directed towards the strong cathode and are slowed down in their displacement by the attraction of the weak cathode. The totality of the $CaCO_3$ particles which are forming constitute within the water a "temporary anode". A calcareous covering forms on the strong cathode. One interposes a supplemental handicap to the passage of the current by means of a static resistance which has for effect to lower the potential difference between the electrodes and to promote the formation and thickening of the polerization layer. The $CaCO_3$ is said to be neutral and the calcareous covering constitutes a dieletric in relation to its thickness. The electromagnetic waves which traverse the dieletric covering accentuate the excitation of the peripheral electrons of the $CaCO_3$ particles and their friction. This excitation is maximum at the internal surface of the covering. The difference in potential rises as a function of the thickness and the excitation of the dieletric layer. At the optimum value, this layer stops growing: the process is in equilibrium. The process continues with the electrification by influence and excitation of the $CaCO_3$ particles on the covering, as long as there is a presence of $Ca(HCO_3)_2$ corresponding to intermittent or continuous passages of the water. When the presence of $Ca(HCO_3)_2$ is very reduced or nonexistent, the maximum excitation of the dieletric layer is maintained by the passage of electromagnetic waves and the electrification of the weak cathode acts as an anode, with a stabilized potential difference.

When the dieletric calcareous layer is formed, the apparatus acts as an electrilitic condenser and the best results are obtained when one of the electrodes completely surrounds the other. By our invention, the treatment of the mineralization is 100% obtained with a time of passage of a quantity of water in the apparatus included between 10 and 180 seconds and an extremely reduced electric consumption. The potential selected and communicated to the micro crystals formed allows for an alkalinization of the water observed during out tests, by an increase of small pH of 3-4/10 and a remarkable foam ability.

The associations of microcrystals which form on the dieletric layer are lasting in time after several days and numerous passages in a heat exchanger. Their excitation by the heat waves is accelerated and rapidly adapts precisely to the heat received so as not to rest on the hot wall thus constituting only a very fine film which does not disrupt heat exchange. On the walls covered with scales, this very film communicates its excitation to the subjacent layer which disagregates when it adapts to the energy source. Finally, the criteria of potability, the hygienic value and the mineralization of the water are preserved by this conditioning. But it often occurs that to be usable or reusable, the water must be completely or partially demineralized and that, in the case of a partial demineralization, the remaining mineralization must be conditioned to avoid the disadvantages of the incrustation and also to confer to the comfort of an excellent foamability. To obtain a demineralization it is necessary to proceed to the decomposition of the acids, bases and salts contained in the water, and positive and negative ions to sequester and to evacuate.

The apparatus is the following: the strong cathode is the metallic wall, bottom included, of a treatment container of cylindrical form. The weak cathode is constituted by a cylindrical grill situated in the axis of the container and insulated from this latter one. An electrically insulated metallic anode occupies the axis of the container. The entire process of conditioning previously described reproduces itself between the strong and weak cathodes with continuous currents. The central insulated anode is connected directly to the positive pole of the generator feeding the strong cathode. The potential difference between the insulated anode and the strong cathode and weak cathodes can thus be considerably greater than 3 volts. It is known that the particles are ferromagnetic, paramagnetic or diamagnetic. The transports of electrons from the strong cathode to the weak cathode act as anode produced by electrophoresis by means of cations which are ferromagnetic or diamagnetic and are pushed towards the strong cathode. The anions (acid radicals) are diamagnetic and concentrate themselves on the insulated anodes. A nonconductive diaphragm, of cylindrical shape, bored with flow distribution holes at its upper portion, is interposed between the insulated anode and the weak cathode, the treatment container being disposed vertically. The water to be treated flows between the strong cathode and weak cathode, at reduced speed. If one wishes to withdraw a portion of the acid radicals, it will suffice to proceed to a purge of the concentration of the central volume periodically or continuously sending the partially demineralized water for use. Depending upon the extent of the purge flow one can withdraw all or part of the acid radicals. If the power of the deconcentration flow exceeds a certain value, the repulsion force of the power magnetic particles can be insufficient and a portion of the latter can be caught up. One can obtain a higher concentration of the acid radicals by treating the volume of the purges in one or more similar apparatuses of reduced dimension. In parallel and in an inverse function to the speed of passage of the water in the apparatus, the ferromagnetic and paramagnetic particles will form muds which are easy to purge. The water freed of the acid radicals containing the ferromagnetic and paramagnetic mineralization can be treated again in a similar apparatus where a drainage in the central volume will give a water which is more or less purified depending upon the adjustment of the drain flow. In parallel a concentration of the remaining mineralization will be obtained at the base of the peripheral volume. A better concentration of this mineralization will be obtained by disposing a container of truncated form, vertical, the major base on top, of a weak cathode grill likewise of truncated form parallel to the wall of the container. In a general fashion, the inlets and outlets of water are done tangentially. Other forms and artifices can be employed for performing the process which is the object of the invention. Finally, the waste can be neutralized by mixing acid and alkaline concentrations, which may even be dried for use as fillers.

BRIEF DESCRIPTION OF THE DRAWINGS

A detailed description of the invention will be made with reference to the drawings attached hereto, in which.

These figures are cited illustratively for the comprehension and the performance of the principle. Furthermore, the evolution of the techniques in the domain of the electronic components brings us to not take into account the exact detail of the electronic components used. However, so as to support the foundation of our observations and our research, the explanatory drawing, FIG. 1, uses the nomenclature of electronic components which have served for assembly of the electric circuit which has made possible our test and whose value is to be taken as being only for experimental purposes; only the principle remains and is usable whenever the evolution of the electronic techniques.

Figure 1:
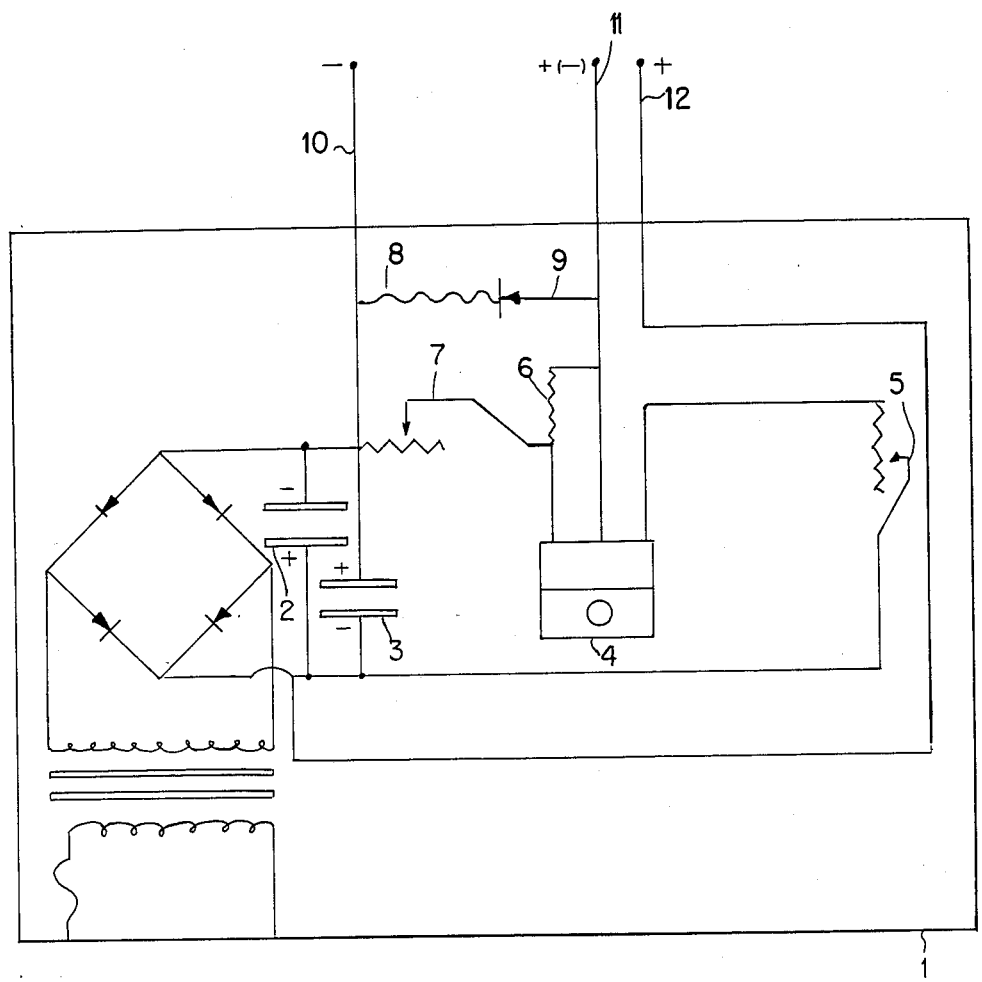
FIG. 1 is a schematic representation of the electric circuit according to the invention.

The apparatus comprises:

an electric console, FIG. 1, comprising an electric circuit (1) enclosing 2 reversed condensers (2) and (3), a voltage stabilizer (4), a potentiometer for adjustment of the stabilized voltage (7), a variable resistance (5) which resists the passage of currents, 2 resistors (6) and (8), a luminescent diode witness lamp (9). The circuit (1) is equipped with 3 connection terminals: the (10) for the strong cathode connection, the (11) for the weak cathode connection, the (12) for the linakge with the anode utilized in the treatment situation shown in FIGS. 3 and 4.

Figure 2:
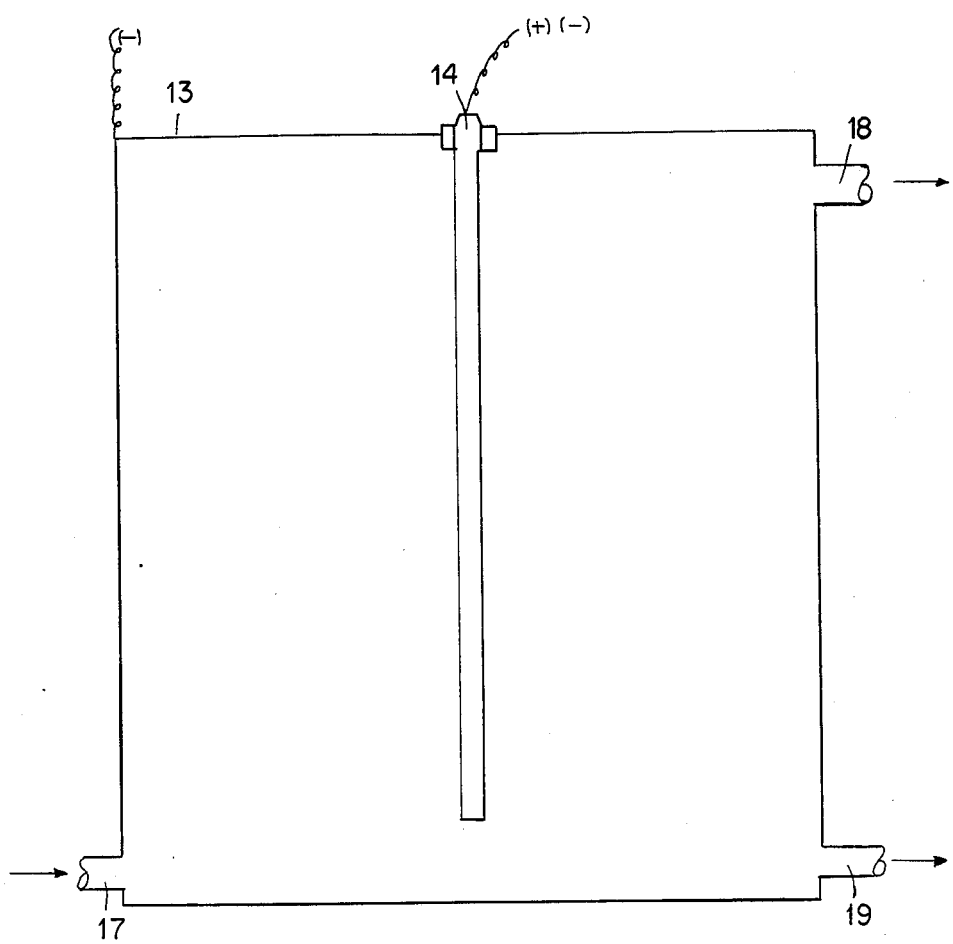
FIG. 2 discloses a simple strong cathode/weak cathode system according to the invention.
Figure 3:
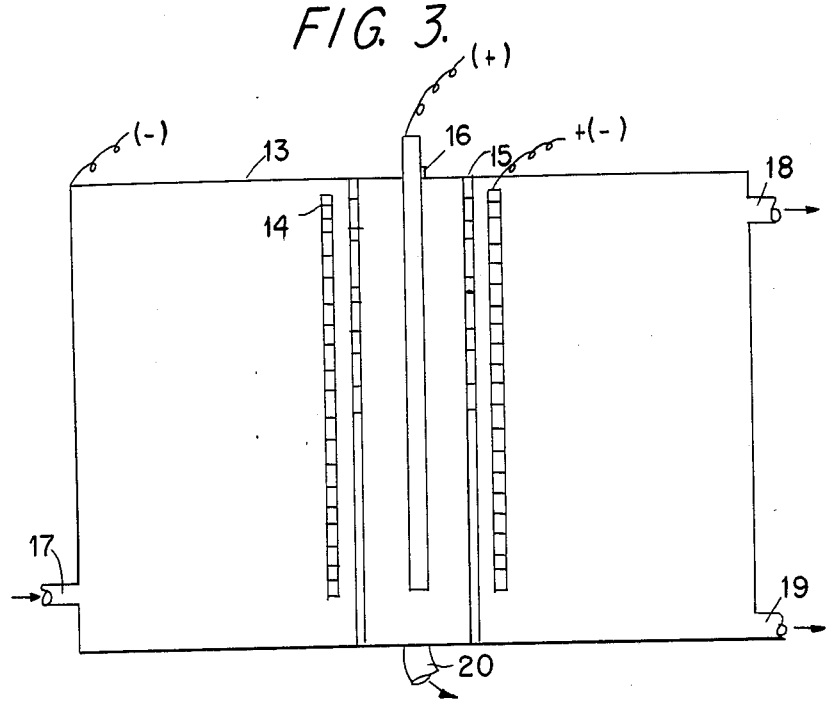
FIG. 3 discloses a strong cathode/weak cathode and anode system according to the invention.
Figure 4:
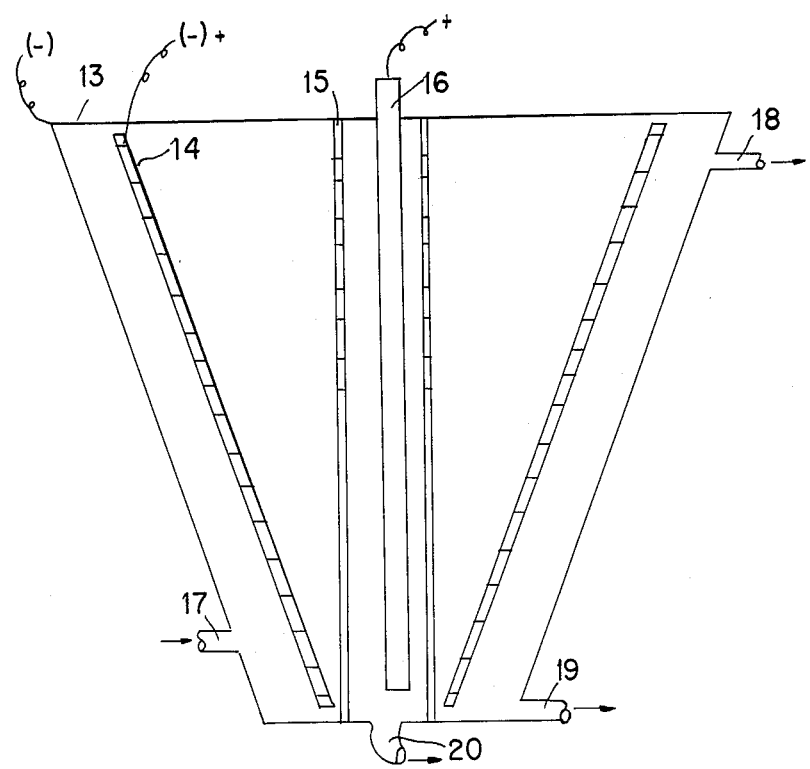
FIG. 4 discloses a system similar to FIG. 3, however, different in geometry.

A treatment container comprising in all of FIGS. 2, 3 and 4 an ionization chamber (13) in which the water to be treated arrives (17) and whose outlet (18) is connected to the conventional feed system of water to be treated. The ionization chamber (13) relies upon the strong cathode and is connected to the reference terminal (10) of FIG. 1. In the case of FIG. 2 the ionization chamber (13) is traversed by a weak cathode (14) connected to the terminal (11) of FIG. 1. The strong terminal (13) is electrically insulated from the weak cathode (14).

A purge orifice completes the assembly (20).

In the case of FIG. 3, the reaction chamber (13) is traversed by a cylindrical, bored weak cathode (grilled type) (14) electrically insulated from the strong cathode (13) and containing a non-conductive slotted diaphragm (15) itself containing an electrically insulated anode (16). The assembly is completed by a purge (20) of the central volume and by a purge (19) of the peripheral volume. In the case of FIG. 4, the arrangements are the same as in FIG. 3, only the geometrical shapes differ for the improvement of the hydraulic.

The possibilities of applications of the invention are immense in the field of furnishing clean water for domestic use, collective use, industry, agriculture by extraction, addition or transformation of all or a portion of the mineralization contained in the water utilized.

What I claim is:

1. Process for treating water so as to confer the water with anti-scale and greater foaming qualities by removing the minerals dissolved therein, the process comprising:
   (a) decomposing the minerals into ferromagnetic particles, paramagnetic particles, and residual particles in an ionization chamber comprising a first cathode and a second cathode carrying a stronger negative charge than said first cathode, said ferromagnetic particles and said paramagnetic particles forming a temporary mobile anode;
   (b) depositing said ferromagnetic particles and said paramagnetic particles as a dielectric layer on said second cathode; and
   (c) removing said dielectric layer formed on said second cathode.

2. The process as defined in claim 1, further comprising adjusting a potential difference between said first cathode and said second cathode to less than 3 volts by a voltage stabilizer, said potential difference corresponding to a potential in ratio with the natural potential of one or more minerals to be treated.

3. A process for treating water by removing minerals dissolved therein, comprising the steps of:
   (a) passing an electric current through the water contained in an ionization chamber thereby decomposing the minerals dissolved in the water into cations and anions, said cations comprising ferromagnetic particles, paramagnetic particles, and residual particles, said ionization chamber comprising a first cathode and a second cathode carrying a stronger negative charge than said first cathode;
   (b) disaggregating said cations and said anions by utilizing said ferromagnetic particles and said paramagnetic particles as a temporary mobile anode facing said first cathode and said second cathode;
   (c) collecting said ferromagnetic and said paramagnetic particles as a dielectric layer on said second cathode; and
   (d) removing said dielectric layer formed on said second cathode.

4. The process for treating water as defined in claim 3, wherein a value of potential difference between said second cathode and said first cathode is maintained at less than three volts and corresponds to the natural potential of at least one mineral being treated.

5. The process for treating water as defined in claim 4, wherein formation and stabilization of said dielectric layer is obtained by impeding passage of current by adjusting a variable resistance as a function of local conditions of the water, said conditions including nature and resistivity of the water.

6. The process for treating water as defined in claim 5, wherein calcium carbonate may be added to obtain a desired pH value of the water.

7. An apparatus for treating water, comprising:
   (a) a strong cathode comprising an electrolytic container and a cylindrically-shaped weak cathode positioned along a central axis of said electrolytic container;
   (b) an electrically insulated anode positioned on said axis of said electrolytic container;
   (c) a cylindrical diaphragm being positioned between said anode and said weak cathode; and
   (d) a direct current generator connected to said strong cathode and said anode.

8. The apparatus for treating water as defined in claim 7, wherein said weak cathode is grilled.

9. The apparatus for treating water as defined in claim 7, wherein said electrolytic container is cylindrical in shape.

10. The apparatus for treating water as defined in claim 7, wherein said electrolytic container is conical in shape.

11. The apparatus for treating water as defined in claim 7, further comprising means for maintaining a potential difference value of less than three volts between said strong cathode and said weak cathode.

* * * * *